United States Patent [19]

Fraser

[11] Patent Number: 5,067,234
[45] Date of Patent: Nov. 26, 1991

[54] TURBINE BLADE REPAIR

[75] Inventor: Michael J. Fraser, Droitwich, United Kingdom

[73] Assignee: Refurbished Turbine Components Limited, United Kingdom

[21] Appl. No.: 629,838

[22] Filed: Dec. 19, 1990

[30] Foreign Application Priority Data

Dec. 22, 1989 [GB] United Kingdom ............... 8929005

[51] Int. Cl.$^5$ .............................................. B23P 7/00
[52] U.S. Cl. .............................. 29/889.1; 29/402.07; 29/402.08; 228/119
[58] Field of Search ............. 29/889.1, 402.18, 402.21, 29/402.07, 402.08; 412/224, 191 R, 196 R, 500; 228/119

[56] References Cited

U.S. PATENT DOCUMENTS

| | | | |
|---|---|---|---|
| 3,576,065 | 1/1971 | Frazier | 29/889.1 |
| 4,028,787 | 6/1977 | Cretella et al. | 29/889.1 |
| 4,050,133 | 9/1977 | Cretella | 29/889.1 |

FOREIGN PATENT DOCUMENTS

| | | | |
|---|---|---|---|
| 0359585 | 3/1990 | European Pat. Off. | 29/889.1 |
| 0359586 | 3/1990 | European Pat. Off. | 29/889.1 |
| 2091139 | 7/1982 | United Kingdom | 29/889.1 |

Primary Examiner—Irene Cuda
Attorney, Agent, or Firm—Armstrong, Nikaido, Marmelstein, Kubovcik & Murray

[57] ABSTRACT

A method of repairing a turbine blade of the type having discontinuities such as lacing wire holes the method including the steps of driving a plug into any such discontinuity that is not in the immediate area that is likely to be subjected to consideration thermal energy as occurs during welding. The presence of the plug decreases the tendency for stress to concentrate around the discontinuity if the blade is subjected to stress caused by physical force or high temperatures.

8 Claims, 3 Drawing Sheets

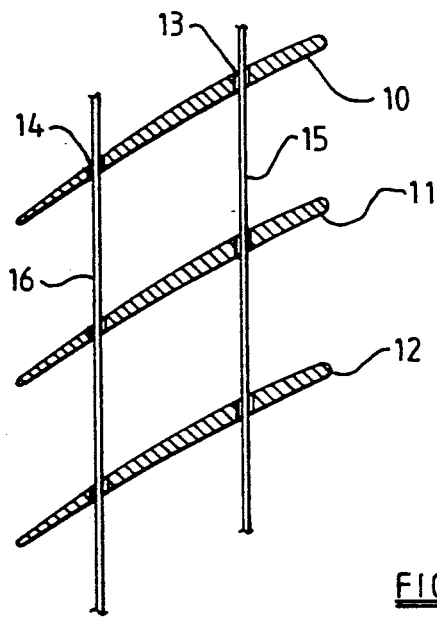
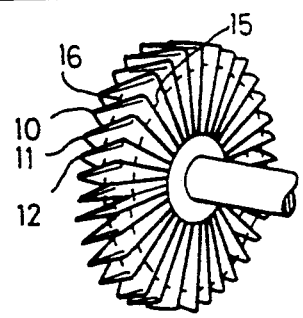
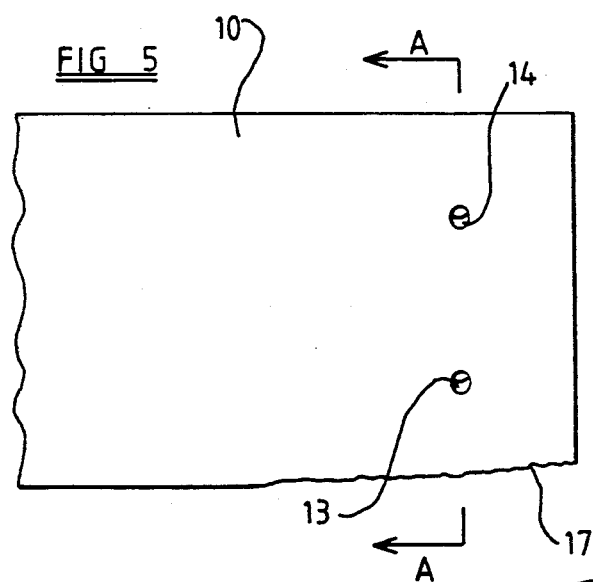
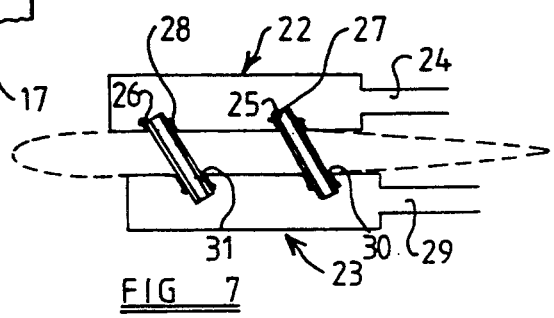

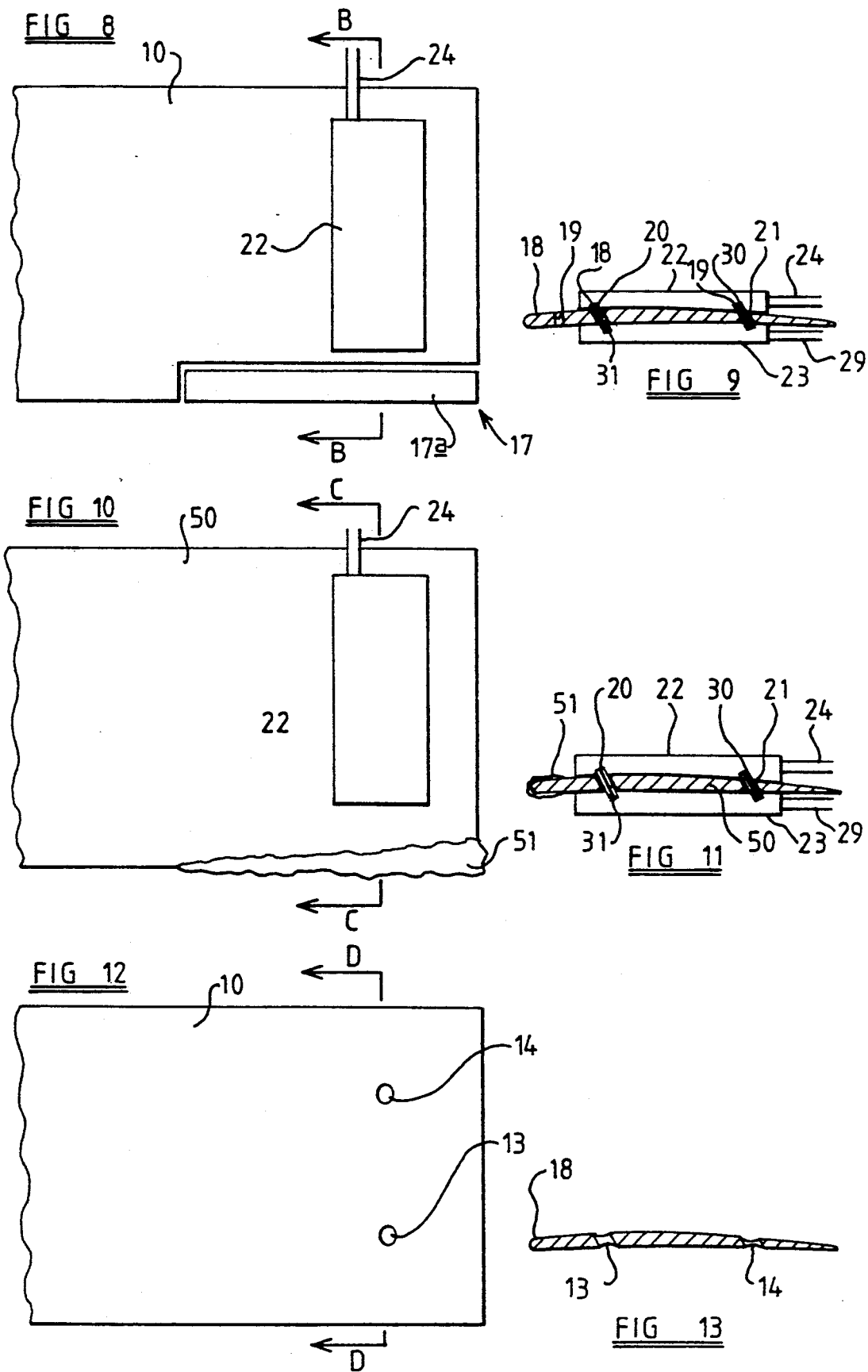

TURBINE BLADE REPAIR

BACKGROUND TO THE INVENTION

Field of the Invention

The present invention relates to a method of repairing turbine blades.

The method of repair is primarily but not exclusively directed to the type of turbine blade in which adjacent blades are interconnected by lacing wires, clamping wires, cover bands or other members which require a hole or other discontinuity to be formed in at least some of the turbine blades, such hole or discontinuity hereinafter being referred to for convenience as a discontinuity.

The purpose of lacing wires, cover bands etc. is to prevent excessive relative movement between the blade and to dampen any vibration during operation of the turbine.

During use of the turbine, inevitably the blades are subjected to wear and damage and particularly in the case of steam turbines they are subjected to the effect known as stress corrosion cracking which is particularly prevalent at the low pressure end of the turbine where it is fairly common for lacing wires to be present in turbine blade arrays.

Whereas it has been the practice for many years to replace damaged turbine blades, new methods of repair now enable satisfactory repairs to be carried out to damaged blades, some of which methods of repair may be carried out while the blades are still in situ on the rotor, thereby making a very significant decrease in the time normally taken to effect such repairs and minimising possible damage to the blades that may well occur if they have to be separated from the rotor assembly.

It has been found by the applicants that irrespective of whether or not the blade is repaired whilst on the rotor, discontinuities are a considerable problem. Whereas it may appear that a satisfactory repair can be carried out to correct damage to the blade, the intense heat necessary during a welding operation leads to a concentration of stress around a discontinuity such as a lacing wire hole, which concentration of stress could later manifest itself in the form of cracks appearing around the lacing wire hole after the blade is put back into use.

It is also necessary in some cases to subject a turbine blade, preferably before repair, to a physical force to bend or pre-distort or otherwise deform the blade with the intention of returning it to its proper position, or displacing it slightly from its proper position with the knowledge that the repair step to be carried out is likely to result in a blade at the end of the repair taking up its proper position or being as close thereto as possible.

It is sometimes necessary to apply heat to the blade to enable such predistortion, this is essential when the blade is of substantial thickness.

It may be that in some cases the repair to be carried out is only at the leading outer edge of the turbine blade and hence it is only necessary to fill, by welding in a plug or filling with weld metal, the lacing wire hole in the vicinity of the weld area.

If however a physical force has to be applied to the blade, as mentioned above, then the whole of the blade may be effected by said physical force and the existence of other lacing wire holes, even though they are not in the vicinity of the weld area, may cause a concentration of stess around the lacing wire holes and, in extreme circumstances the application of physical force can cause distortion of the lacing wire hole making it difficult to replace the lacing wires.

Any input of stress to the blade would necessitate a heat treatment process which itself can lead to concentration of stress around discontinuities.

To overcome this problem, applicants have proposed that such discontinuities are always filled with weld metal prior to the commencement of any welding operation. This seemingly unnecessary step leads to a vast improvement in the reliability of the repaired blades.

As the methods of repair become more intricate and apparatus is developed for repairing turbine blades while in situ on the rotor, it has been found that whereas damage to leading and trailing edges may be repaired whilst the blades are in situ on the rotor, the filling of discontinuities with weld metal may not in all cases be possible since either access to the blade by welding apparatus in the position where the discontinuity is situated is impossible or, even though filling of the discontinuity might be possible, subsequent redrilling of the hole after the repair has been carried out is not possible.

Since applicants are aware that an absence to fill the discontinuity is unsatisfactory, it did not therefore appear to be possible to repair such blades whilst still on the rotor and be confident of a satisfactory service life after repair.

SUMMARY OF THE INVENTION

It is an object of the present invention to provide a new and improved method of repairing turbine blades that overcomes or minimises the problems mentioned above.

According to a first aspect of the present invention, we provide a method of repairing a turbine blade of the type having a discontinuity, the method comprising the steps of:

(a) providing a plug of approximately the same cross-section as said discontinuity;

(b) driving or otherwise fitting said plug into said discontinuity so that the plug is a tight fit in the discontinuity;

(c) carrying out a repair step to the turbine blade involving the input of stress to the blade;

(d) applying heat treatment to the blade for stress relief at least in any area where considerable thermal energy has been applied to the blade;

(e) removing said plug from said discontinuity.

The repair step involving the input of stress to the blade may comprise the application of a physical force and/or the application of considerable thermal energy.

In some cases it may not be necessary to carry out a weld repair on a blade and the only repair step that may be necessary would be to re-align a distorted or bent turbine blade and the stress input to the blade is primarily due to the physical force that has to be applied.

Where such a physical force has to be applied, the plugging of the discontinuity of the blades, such as lacing wire holes, ensures that further concentrations of stress around such discontinuities are prevented.

Even after the application of physical force, it may be necessary to provide heat treatment processes, where this is the case the plug will remain in place in the discontinuity during said heat treatment process since the temperatures to which the blade has to be raised to cause satisfactory stress relief may itself cause stress in any discontinuity that is left unplugged.

It has quite unexpectedly been found that providing the area with the discontinuity is not immediately adjacent the area to which considerable thermal energy is to be applied, then the existence of a plug in the discontinuity, such as a lacing wire hole, appears to be highly effective in preventing distortion of the lacing wire hole, and furthermore minimises the occurrence of the build up of stress should the blade be subjected to considerable physical force or during subsequent heat treatment.

In some cases, it may be that the discontinuity is in an area which, whilst not immediately adjacent the area to which considerable thermal energy is to be applied, is sufficiently close to the area around the discontinuity to be subjected to a concentration of stress because of migration of heat from the area of repair.

The plugs for plugging the discontinuities may be made slightly longer than the thickness of the discontinuity which they have to fill and it is envisaged that the end portion may be given a slight taper to facilitate the insertion of the plugs into the discontinuity.

According to a second aspect of the present invention, we provide a method of repairing a turbine blade of the type having a discontinuity, the method comprising the steps of:

(a) providing a plug of approximately the same cross-section as said discontinuity;
(b) driving or otherwise fitting said plug into said discontinuity so that the plug is a relatively tight fit;
(c) providing a heat sink in the area of said discontinuity;
(d) carrying out a repair step to the turbine blade involving the input of stress to the blade;
(e) applying heat treatment to the blade for stress relief at least in any area where considerable thermal energy has been applied to the blade;
(f) removing said plug from said discontinuity.

The repair step involving the input of stress to the blade may comprise the application of a physical force and/or the application of considerable thermal energy.

It has been found that, providing the area of discontinuity is provided with a heat sink, the plug provides a satisfactory answer to prevent concentration of stress due to physical force and a heat sink ensures that the area of discontinuity is prevented from reaching a temperature such that high concentrations of stress result from the application of considerable thermal energy.

Preferably the heat sink is connected to said plug and it is envisaged that in some cases the plug may be provided with a through bore through which cooling fluid may pass.

Preferably the heat sink passes at least partially into the discontinuity through the hole and conveniently may incorporate a flow of cooling liquid so as to further reduce the likelihood of heat build up in the vicinity of the discontinuity.

Where there is sufficient room it is envisaged that the plug may be made of a length greater than the thickness of the discontinuity which it has to fill such that end portions project outwardly from the turbine blade which has the effect of conducting heat away from that area by convection or, if provided with additional heat sinks in contact therewith or with a supply of cooling fluid, may also transmit heat away from the area by means of conduction.

In some cases it may be desirable to leave the heat sink in place during any stress relieving heat treatment process and in other cases it may be preferred to remove the heat sink prior to the heat treatment process being carried out after removal of the heat sink.

The discontinuity may be other than circular in cross-section and the plug will be dimensioned accordingly.

In the case where the discontinuity comprises a lacing wire hole, it may be that in some cases it is unnecessary or not easily possible to remove the lacing wire. In such a case the heat sink will be provided in the region surrounding the lacing wire hole and could be secured in thermal communication with the lacing wire itself. In such a case, the lacing wire can be used as a thermal conductor to conduct heat away from the area of the lacing wire hole.

It is also envisaged that the use of a heat sink may be used where the discontinuity comprises an insert of a metal different from the parent material of the blade, for example an erosion shield, which may be brazed onto the blade itself and in such a case heat sinks would be used to prevent migration of excessive heat to the area of the shield and such heat sinks would be left in operation during any heat treatment process to ensure that the temperatures to which the blade was subjected would not adversely affect the area of the erosion shield. In the absence of the heat sink, the heat generated during heat treatment could in some circumstances be of sufficient temperature to melt the brazed metal or at least render the brazed metal in a condition whereby it may no longer securely fix the erosion shield to the blade.

BRIEF DESCRIPTION OF THE DRAWINGS

The invention will now be described in more detail by way of example only with reference to the accompanying drawings, wherein:-

FIG. 1 is a cross-sectional view looking radially inwardly of turbine blades interconnected by lacing wires;

FIG. 2 is a perspective view of a complete turbine rotor;

FIG. 5 is a view of an end region of the turbine blade illustrating an area where erosion is common;

FIG. 6 is a cross-section of the turbine blade taken along the line A—A of FIG. 5;

FIG. 7 is a cross-sectional view through one embodiment of a heat sink;

FIGS. 8 and 9 illustrate the heat sink shown in FIG. 7 between one stage of a repair process;

FIGS. 10 and 11 illustrate a further stage in the repair; and

FIGS. 12 and 13 illustrate the blade after repair.

DESCRIPTION OF THE PREFERRED EMBODIMENTS

Referring first to FIGS. 1 and 2, three turbine blades are shown at 10, 11 and 12, each turbine blade having discontinuities in the form of through bores 13 and 14 through which pass respective lacing wires 15 and 16.

The lacing wires 15 and 16 can pass either with clearance through the respective through bores 13 and 14 in the turbine blades or may be joined to each turbine blade by brazing for example.

If the wires pass freely through the through bores 13 and 14, in use of the turbine, the radially outwardly directed centrifugal force on such wires (normally referred to as clamping wires) between adjacent turbine blades will cause pressure contact between the wires and the turbine blades, such pressure contact being sufficient to provide the required restriction of relative movement between adjacent turbine blades.

FIG. 2 illustrates an example of a rotor from a turbine, the turbine blades 10, 11 and 12 being three of a considerable number of blades forming the complete array in the rotor.

Turbine blades such as those shown at 10, 11 and 12 can be made from a variety of materials depending upon the function and operating condition of the turbine. A typical material from which a blade in a steam turbine may be manufactured is chrome steel, the chrome content of which is approximately 12%.

Figure 3:
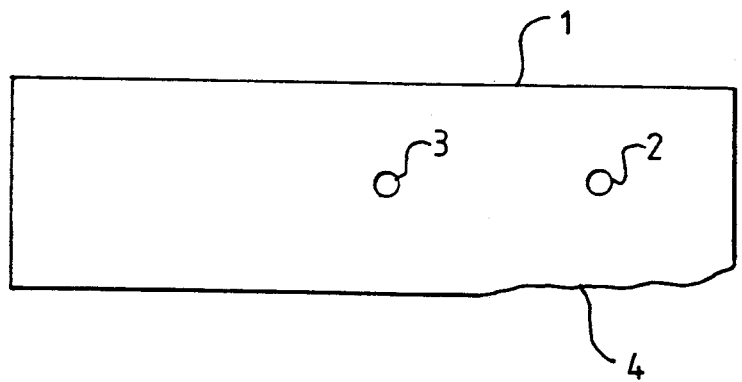
FIG. 3 is a diagrammatic view of a turbine blade having a pair of lacing wire holes and also showing erosion and damage on the leading outer edge.
Figure 4:
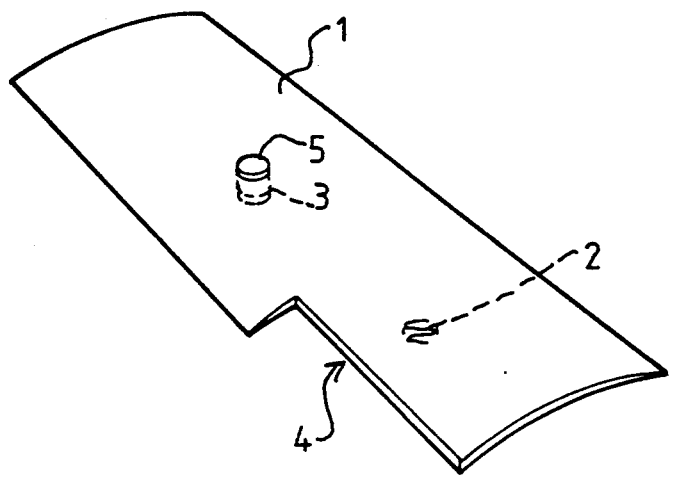
FIG. 4 is a view of the turbine blade shown in FIG. 3 in which one lacing wire hole has been plugged and the other filled.

Referring now to FIGS. 3 and 4, a turbine blade 1 has a pair of lacing wire holes 2 and 3. Damage is shown in the area 4 which damage may comprise erosion, cracks and the like and the nature of the repair normally requires an area at the outer leading edge as shown by arrow 4 to be removed from the blade and a new piece of material welded thereto.

The lacing wire hole 2 being in close proximity to the repair area will, in accordance with methods of repair already proposed by the applicants, be filled with weld metal. However, access to the lacing wire hole 3, if it is desired to carry out the repair without removing the blade from the rotor, is extremely difficult if not impossible and to fill the hole with weld metal and subsequently re-drill the hole may not be possible. Furthermore, in view of the fact that it is not immediately adjacent the repair area 4 it would not be expected that it would be subjected to a substantial rise in temperature. However, that area may be subjected to stress if the blade has to be subjected to a physical force for re-alignment purposes or positive distortion. Furthermore, stress relieving heat treatment may lead to an undesired concentration of stress around the hole 3.

Referring now in addition to FIG. 4, the turbine blade 1 has had the lacing wire hole 2 filled with weld metal. As an alternative a plug may be welded into the lacing wire hole, thus removing the discontinuity.

A plug 5 has been driven into the lacing wire hole 3, the plug 5 may be of the same metal as the turbine blade or any other suitable material, the essential requirement being that it is a relatively tight fit within the lacing wire hole 3 and causes the blade to "act" as a solid member so that any physical distortion of the blade following the application of force thereto does not lead to a concentration of stress and possible distortion to the lacing wire hole 3.

It will be appreciated that the provision of the plug 5 does not remove the discontinuity in the same manner as filling the lacing wire hole with weld metal as shown at 2, but by providing a close fitting plug in the lacing wire hole 3 the possibility of concentrations of stress arising in this area due to the application of physical force are substantially reduced.

It is further envisaged that if for example the lacing wire hole 3 is subjected to considerable heat, which may occur not only as a result of the repair being carried out but during stress relief of the blade after repair then it may be desired to provide a heat sink in the vicinity of the lacing wire hole to ensure that the area of the blade surrounding the lacing wire hole is not raised to a temperature which may lead to a concentration of stress.

The provision of a combination of heat sink and plug will now be described in more detail with reference to FIGS. 5 to 13.

Referring now in addition to FIG. 5, the area of the turbine blade which is most prone to erosion is illustrated, this being the leading edge 17 of the outer end of the turbine blade since it is this part of the blade which collides with the steam or particles carried thereby during use of the turbine blade, and it is the part of the turbine blade which has the greatest linear speed, being the radially outermost point from the axis of rotation.

FIG. 6 is a cross-section of the turbine blade 10 and even though the erosion may be fairly severe in the area 17, it is not normally so extensive as to reach as far back in the blade as the nearest lacing wire hole 13.

Two plugs 18 and 19 are secured or driven into lacing wire holes 13 and 14.

The plugs 18 and 19 are longer than the thickness of the turbine blade through which they project and are dimensioned so as to be a tight fit in the lacing wire holes 13 and 14. The reason for the extra length of the plugs 18 and 19 is such that they can co-operate with a heat sink or chill comprising a pair of box-like members through which cooling fluid may flow and as illustrated in more detail in FIG. 7.

The plugs 18 and 19 are each provided with a through bore or passageway 20 and 21 respectively through the centre thereof.

FIG. 7 illustrates an embodiment of the heat sink or chill and comprises a pair of box-like members 22 and 23. The box 22 has an inlet 24 for fluid and a pair of apertures 25 and 26 provided with respective seals 27 and 28.

The box 23 has an outlet 29 and a pair of apertures 30 and 31 each provided with seals and the heat sink is positioned on a box on either side of the blade, the blade being shown in dotted outline at 10 so that each box makes sealing contact with the plugs 18 and 19 and fluid may flow into inlet 24 through the box 22 through the through bores 20 and 21 in plugs 18 and 19 and out through outlet 29.

The plugs 18 and 19 thus act not only to prevent distortion of the lacing wire holes and any concentration of stress in this area due to the application of physical force to the blade but also provide a passageway and connecting means to ensure that during welding of the area 17 the areas immediately surrounding the lacing wire holes 13 and 14 is not raised to a temperature which could cause permanent damage to the blade.

In this manner, the area of the turbine blade 10 surrounding the lacing wire holes 13 and 14 may be kept cool notwithstanding the fact that welding will take place on the blade in the region of the leading edge thereof, for example the insertion of a new piece of material 17a which will now be briefly described with reference to FIGS. 8 to 13.

A piece of material is cut out from the margin bordering the leading edge 17 of the blade 10 and a new piece 17a of hard material, which may be a hardened tool steel or Stellite or may comprise a piece of material substantially the same as that from which the remainder of the blade 10 is made and may be subsequently hardened after securing to the blade, is welded to the turbine blade 10.

The material used for welding is a weld material able to form a satisfactory bond with the parent material of the blade and may be selected so that it forms a cushioning element between the new piece 17a and the remainder of the blade 10.

An alternative repair is shown in FIGS. 10 and 11, the turbine blade 50 shown therein has the heat sink 22 and 23 secured thereto in a manner identical to that shown in FIGS. 8 and 9. However, in this case a repair is carried out by the addition of fused metal by a welding process and, once the welded metal 51 has been applied to the blade, a machining operation may be carried out to return the blade to its original form.

FIGS. 12 and 13 shows the blade 10 after the repair involving the application of considerable thermal energy, i.e. the welding, has been carried out and the heat sink is removed prior to heat treatment of the blade.

Where the heat sink 22 and 23 is removed prior to heat treatment, it is important that no severe heat treatment is carried out in the vicinity of the lacing wire holes 13 and 14 otherwise the heat treatment itself may give rise to inbuilt stress due to the discontinuity afforded by the lacing wire holes.

Whereas the present invention has been described with reference to lacing wire holes, it will be appreciated that a heat sink in the form as illustrated, or any alternative form or shape as may be applicable, depending on the part of the blade to which it is to be applied, may be used in accordance with the method of the invention.

I claim:

1. A method of repairing a turbine blade of the type having a discontinuity, the method comprising the steps of:
   (a) providing a plug of approximately the same cross-section as said discontinuity;
   (b) driving said plug into said discontinuity so that the plug is a tight fit in the discontinuity, without the need for any welding;
   (c) carrying out the repair step to the turbine blade involving the input of stress to the blade;
   (d) applying heat treatment to the blade for stress relief at least in any area where considerable thermal energy has been applied to the blade;
   (e) removing said plug from said discontinuity.

2. A method of repairing a turbine blade according to claim 1 wherein the repair step involving the input of stress to the blade comprises the application of physical force to the blade.

3. A method of repairing a turbine blade according to claim 1 wherein the repair step involving the input of stress to the blade comprises the application of considerable thermal energy to the blade.

4. A method of repairing a turbine blade according to claim 3 wherein the application of considerable thermal energy to the blade results from a welding operation on the blade.

5. A method of repairing a turbine blade according to claim 1 wherein said plug has a length greater than the depth of said discontinuity such that when said plug is in said discontinuity it extends away from the surface of the blade.

6. A method of repairing a turbine blade of the type having a discontinuity, the method comprising the steps of:
   (a) providing a plug of approximately the same cross-section as said discontinuity;
   (b) driving or otherwise fitting said plug into said discontinuity so that the plug is a relatively tight fit;
   (c) providing a heat sink in the area of said discontinuity;
   (d) carrying out a repair step to the turbine blade involving the input of stress to the blade;
   (e) applying heat treatment to the blade for stress relief at least in any area where considerable thermal energy has been applied to the blade;
   (f) removing said plug from said discontinuity.

7. A method of repairing a turbine blade according to claim 6 wherein said heat sink is connected to said plug.

8. A method of repairing a turbine blade according to claim 7 wherein said plug is provided with a through bore and connection means are provided to permit of the flow of cooling fluid through said plug.

* * * * *